United States Patent
Cormier et al.

(10) Patent No.: US 11,042,545 B2
(45) Date of Patent: *Jun. 22, 2021

(54) CLASS SPECIFIC CONTEXT AWARE QUERY PROCESSING

(71) Applicant: Splunk Inc., San Francisco, CA (US)

(72) Inventors: Michael E. Cormier, Delray Beach, FL (US); William E. Thackrey, Redondo Beach, CA (US); Earl D. Cox, Delray Beach, FL (US)

(73) Assignee: Splunk Inc., San Francisco, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 16/105,577

(22) Filed: Aug. 20, 2018

(65) Prior Publication Data
US 2018/0357281 A1    Dec. 13, 2018

Related U.S. Application Data

(63) Continuation of application No. 14/729,964, filed on Jun. 3, 2015, now Pat. No. 10,095,471, which is a
(Continued)

(51) Int. Cl.
*G06F 16/20* (2019.01)
*G06F 16/2453* (2019.01)
(Continued)

(52) U.S. Cl.
CPC .... *G06F 16/24545* (2019.01); *G06F 16/2468* (2019.01); *G06F 16/24537* (2019.01);
(Continued)

(58) Field of Classification Search
CPC ........... G06F 16/24545; G06F 16/2468; G06F 16/90335; G06F 16/36; G06F 16/24537; G06F 16/24575
See application file for complete search history.

(56) References Cited

U.S. PATENT DOCUMENTS 5,577,169 A    11/1996  Prezioso
5,687,290 A    11/1997  Lewis
(Continued)

OTHER PUBLICATIONS

Bordogna, G. et al., "A Fuzzy Linguistic Approach Generalizing Boolean Information Retrieval: A Model and Its Evaluation", Journal of the American Society for Information Science 44(2): 70-82, Mar. 1993 (13 pages).
(Continued)

*Primary Examiner* — Tarek Chbouki
(74) *Attorney, Agent, or Firm* — Ferguson Braswell Fraser Kubasta PC

(57) ABSTRACT

The disclosed embodiments relate to a system that updates a context that facilitates evaluating qualitative search terms for an attribute during query processing. During operation, the system extracts a value for the attribute from each data item in a set of data items. Next, the system updates the context based on the extracted attribute values, wherein the context includes a concept-mapping for one or more qualitative search terms applied to the attribute, and wherein each concept-mapping associates a given attribute value with a numerical compatibility index that indicates a compatibility between the given attribute value and a corresponding qualitative search term.

25 Claims, 15 Drawing Sheets

Related U.S. Application Data continuation of application No. 14/448,215, filed on Jul. 31, 2014, now Pat. No. 9,129,041.

(51) Int. Cl.
  *G06F 16/36* (2019.01)
  *G06F 16/2458* (2019.01)
  *G06F 16/2457* (2019.01)
  *G06F 16/903* (2019.01)

(52) U.S. Cl.
  CPC ........ *G06F 16/24575* (2019.01); *G06F 16/36* (2019.01); *G06F 16/90335* (2019.01)

(56) References Cited

U.S. PATENT DOCUMENTS

| | | | |
|---|---|---|---|
| 6,980,984 B1* | 12/2005 | Huffman | G06F 16/3331 |
| 7,181,438 B1 | 2/2007 | Szabo | |
| 7,194,483 B1 | 3/2007 | Mohan et al. | |
| 7,555,490 B1 | 6/2009 | Neal | |
| 7,603,349 B1 | 10/2009 | Kraft et al. | |
| 8,311,973 B1 | 11/2012 | Zadeh | |
| 2003/0217052 A1 | 11/2003 | Rubenczyk et al. | |
| 2004/0034633 A1 | 2/2004 | Rickard | |
| 2005/0154690 A1* | 7/2005 | Nitta | G06F 16/30 706/46 |
| 2007/0263900 A1 | 11/2007 | Medasani et al. | |
| 2007/0282826 A1* | 12/2007 | Hoeber | G06F 16/36 |
| 2008/0033982 A1* | 2/2008 | Parikh | G06F 16/24575 |
| 2008/0059390 A1 | 3/2008 | Cox et al. | |
| 2010/0070448 A1 | 3/2010 | Omoigui | |
| 2011/0145232 A1* | 6/2011 | Chang | G06F 16/9032 707/728 |
| 2011/0314010 A1 | 12/2011 | Ganti et al. | |
| 2012/0150753 A1 | 6/2012 | Collins | |
| 2012/0179710 A1 | 7/2012 | Hanai | |
| 2012/0197928 A1 | 8/2012 | Zhang et al. | |
| 2012/0296913 A1 | 11/2012 | Ash et al. | |
| 2013/0006914 A1* | 1/2013 | Ray | G06N 5/02 706/50 |
| 2013/0018875 A1* | 1/2013 | Qiao | G06F 16/3331 707/723 |
| 2013/0041921 A1* | 2/2013 | Cooper | G06F 16/3338 707/780 |
| 2013/0318236 A1 | 11/2013 | Coates et al. | |
| 2014/0201126 A1 | 7/2014 | Zadeh et al. | |
| 2015/0206070 A1 | 7/2015 | Kulkarni et al. | |

OTHER PUBLICATIONS

Samani, Z.R. et al., "On the Application of Fuzzy Ontology for Qualitative Spatial Reasoning", pp. 9-18, Journal of Next Generation Information Technology (JNIT) vol. 3, No. 2, May 2012 (10 pages).

Office Action in related U.S. Appl. No. 14/448,215 dated Oct. 9, 2014 (21 pages).

Office Action in related U.S. Appl. No. 14/729,964 dated Dec. 9, 2016 (10 pages).

Office Action in related U.S. Appl. No. 14/729,964 dated Mar. 1, 2017 (11 pages).

Office Action in related U.S. Appl. No. 14/729,964 dated Sep. 29, 2017 (11 pages).

Office Action in related U.S. Appl. No. 14/448,182 dated Jan. 6, 2015 (17 pages).

Office Action in related U.S. Appl. No. 14/729,884 dated Feb. 21, 2017 (16 pages).

Office Action in related U.S. Appl. No. 14/729,884 dated Aug. 4, 2017 (17 pages).

Office Action in related U.S. Appl. No. 14/729,884 dated Jun. 27, 2018 (17 pages).

* cited by examiner

```
Original Search: 501
search "error | stats count BY host

Sent to peers: 502
search "error | prestats count BY host (map)

Executed by search head: 503
Merge prestats results received from peers (reduce)
```

CONCEPTUAL-SEARCH COMMANDS xsCloneConcept
xsCloneContext
xsCreateConcept
xsCreateContext
xsCreateUDContext
xsDeleteConcept
xsDeleteContext
xsGetWhereCIX
xsListConcepts
xsListContexts
xsListUOM
xsMergeContexts
xsRenameContext
xsUpdateContext xsDiscoverTrend
xsDisplayConcept
xsDisplayContext
xsDisplayWhere
xsFindBestConcept
xsFindMembership
xsGetCompatibility
xsUpdateUDContext
xsWhere
`Find_Best_Concept(3)`
`Create_Context(2)`
`Discover_Trend(3)`

FIG. 9A

STATISTICAL-REASONING COMMANDS xsAggregateAutoRegression
xsAggregateCorrelation
xsAggregateLinearRegression
xsAggregateNonLinearRegression
xsAggregateSpearmanCorrelation
xsApplyAutoRegression
xsApplyLinearRegression xsApplyNonLinearRegression
xsPerformAutoRegression
xsPerformCorrelation
xsPerformLinearRegression
xsPerformNonLinearRegression
xsPerformSpearmanCorrelation

OTHER COMMANDS xsPredict
xsGetDistance

FIG. 9B

CLASS SPECIFIC CONTEXT AWARE QUERY PROCESSING

RELATED APPLICATION

The present application is a continuation application of and, thereby, claims benefit under 35 U.S.C. § 120 to U.S. application Ser. No. 14/729,964, entitled, "Technique for Context Updating and Query Processing for Evaluating Qualitative Search Terms," filed on Jun. 3, 2015, having the same inventors, and incorporated herein by reference. U.S. application Ser. No. 14/729,964 is a continuation of and, thereby, claims benefit under 35 U.S.C. § 120 to U.S. application Ser. No. 14/448,215, entitled, "Technique for Updating a Context that Facilitates Evaluating Qualitative Search Terms," filed on Jul. 31, 2014, having the same inventors, and incorporated herein by reference. Thus, the present application claims benefit of both U.S. application Ser. No. 14/729,964 and U.S. application Ser. No. 14/448,215.

The subject matter of this application is related to the subject matter in U.S. application Ser. No. 14/448,182 filed on Jul. 31, 2014 and to the subject matter in U.S. application Ser. No. 14/729,884 filed on Jun. 3, 2015.

BACKGROUND

Field of the Invention

The disclosed embodiments generally relate to techniques for searching through data. More specifically, the disclosed embodiments relate to the design of a system that facilitates executing conceptual queries that search through data using qualitative search terms, such as "short" and "tall."

Related Art

Humans typically think about physical parameters using qualitative concepts, such as "fast" or "slow," instead of a precise numerical value, such as "25.6 miles per hour." As a consequence, when analysts search through data, they are typically interested in identifying data items that satisfy qualitative criteria. For example, an analyst may want to identify servers having an "unusually long response time." In existing query-processing systems, an analyst typically translates qualitative criteria into corresponding numerical values before performing a search. This process is both time-consuming and problematic because the numerical values for specific qualitative search criteria can vary considerably among different contexts. For example, the definition of an "unusually long response time" for a computer server is likely to be different during a peak-usage time in the middle of the day in comparison to a low-usage time in the middle of the night. Also, the definition of a specific qualitative search criterion can vary among different users and different contexts.

Hence, what is needed is a system that facilitates performing searches based on qualitative search criteria that can vary among different usage contexts.

BRIEF DESCRIPTION OF THE DRAWINGS

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 9A illustrates various conceptual-search commands in accordance with the disclosed embodiments.

FIG. 9B illustrates statistical-reasoning commands and other commands in accordance with the disclosed embodiments.

DETAILED DESCRIPTION

Figure 1:
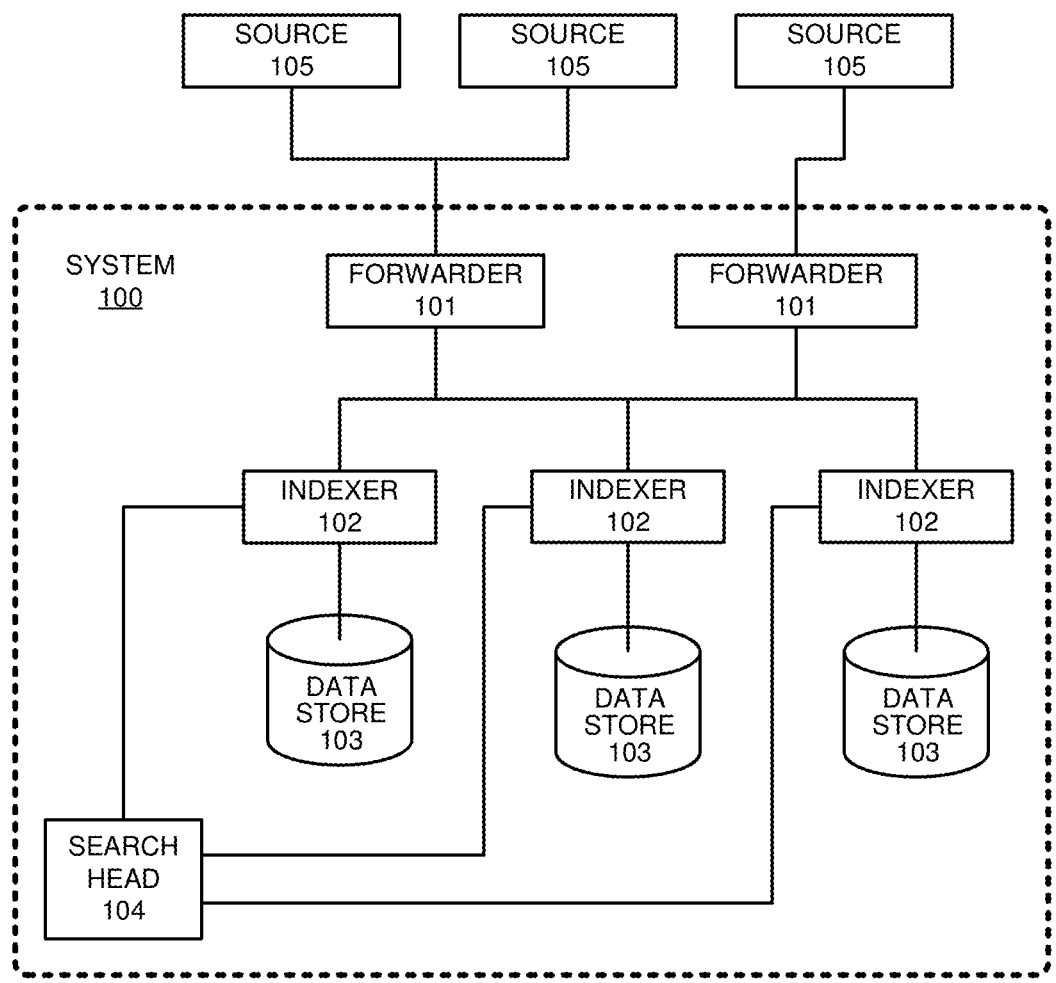
FIG. 1 presents a block diagram of an event-processing system in accordance with the disclosed embodiments.

The disclosed embodiments relate to a query-processing system that performs searches based on qualitative search terms. This query-processing system is described in more detail below, but first we describe the structure of an event-based system in which this query-processing system operates.

1.1 System Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
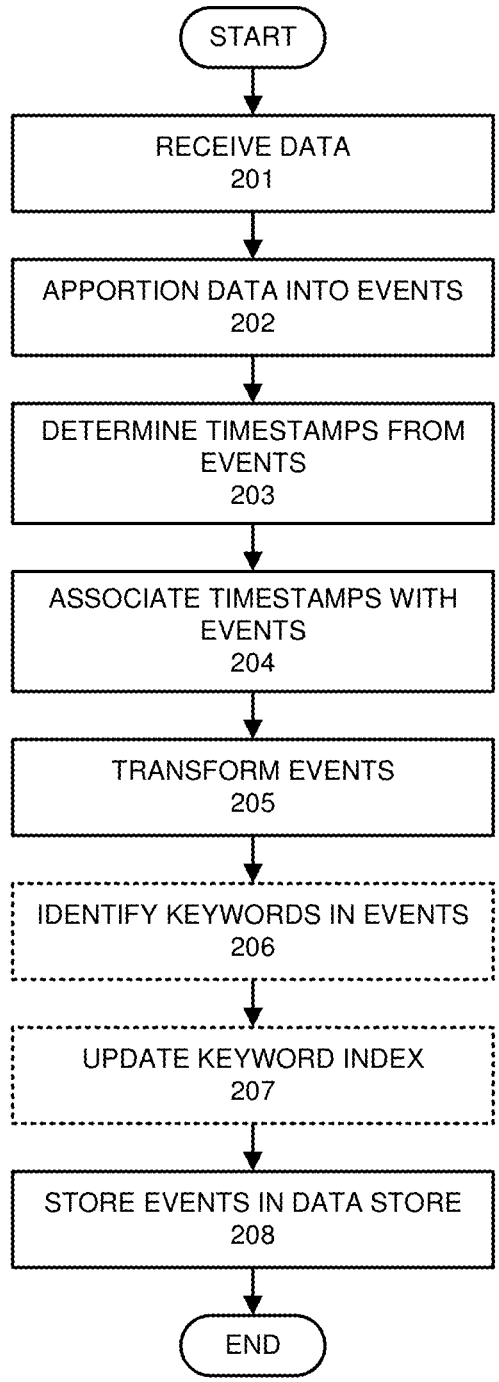
FIG. 2 presents a flow chart illustrating how indexers process, index, and store data received from forwarders in accordance with the disclosed embodiments.

FIG. 2 presents a flow chart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S.

patent application Ser. No. 14/266,812 filed on 30 Apr. 2014, and in U.S. application patent Ser. No. 14/266,817 also filed on 30 Apr. 2014.

1.4 Query Processing

Figure 3:
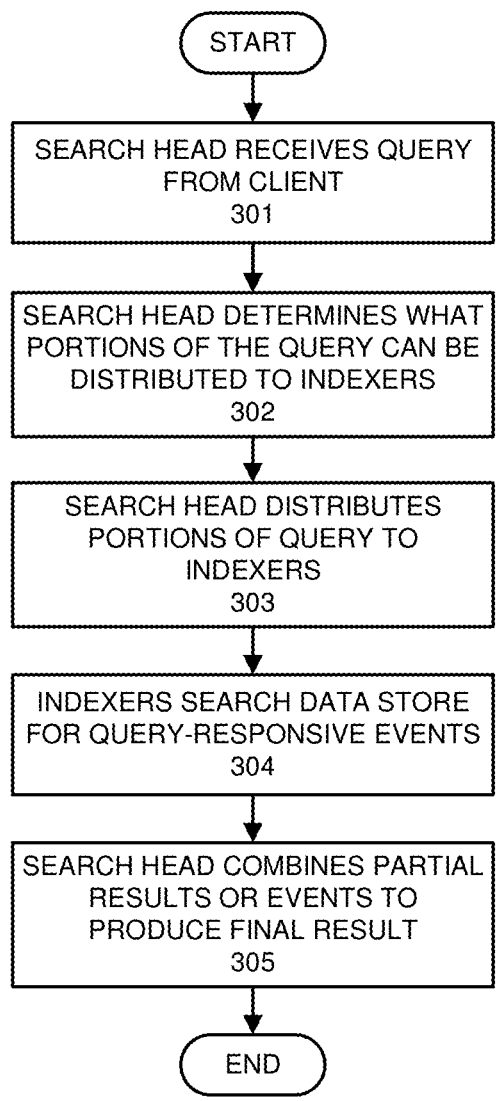
FIG. 3 presents a flow chart illustrating how a search head and indexers perform a search query in accordance with the disclosed embodiments.

FIG. 3 presents a flow chart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
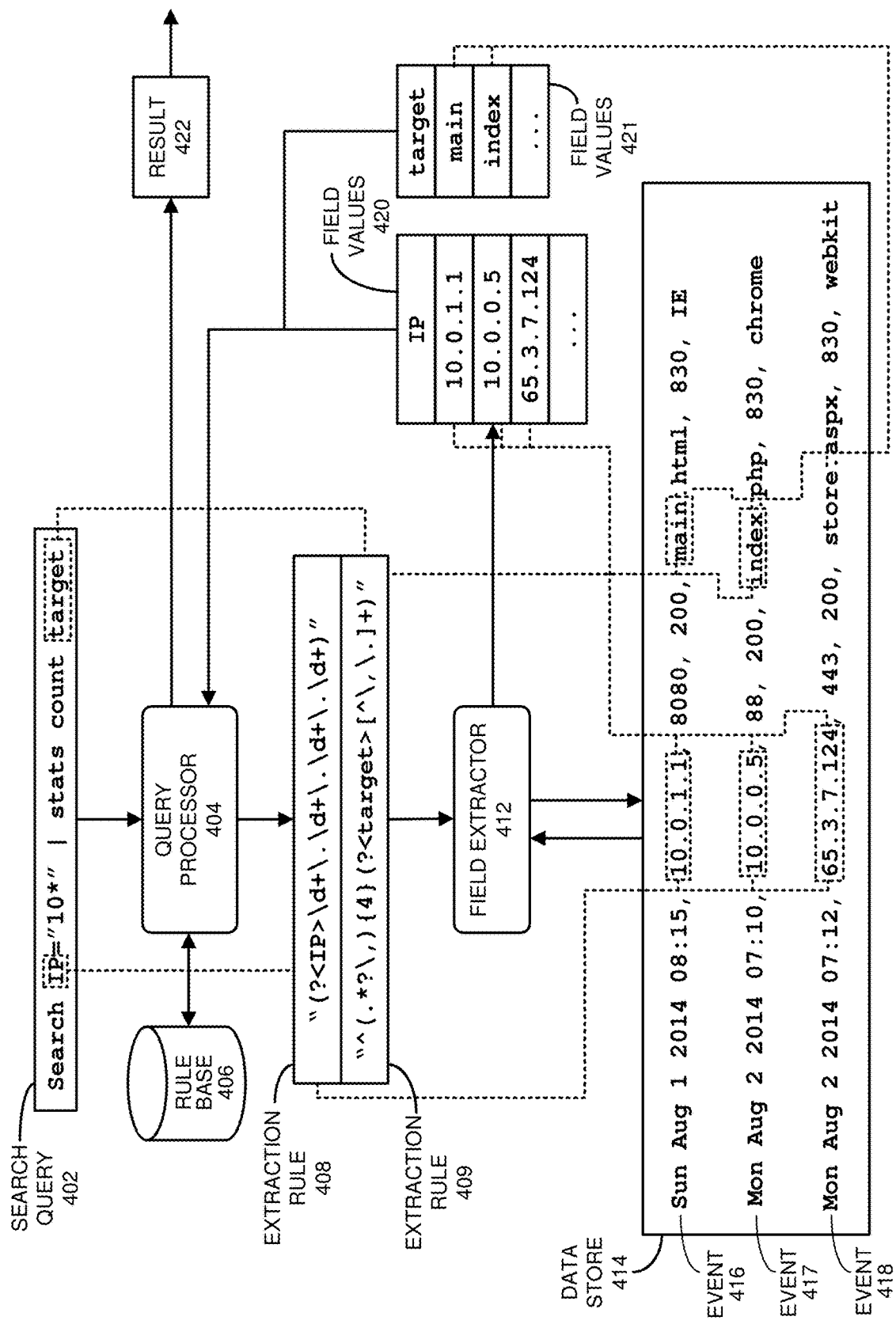
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in the Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
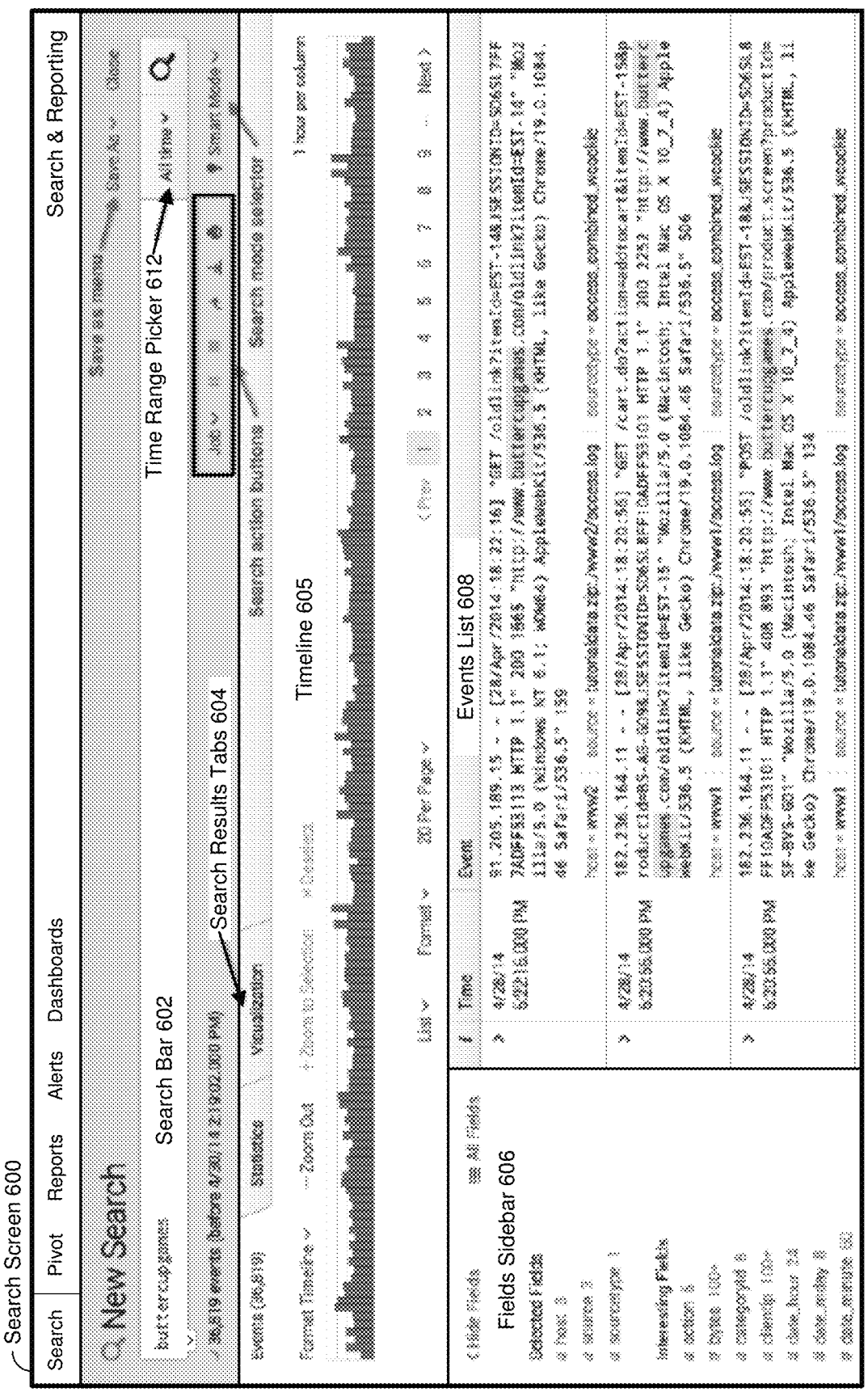
FIG. 6A illustrates a search screen in accordance with the disclosed embodiments.
Figure 6B:
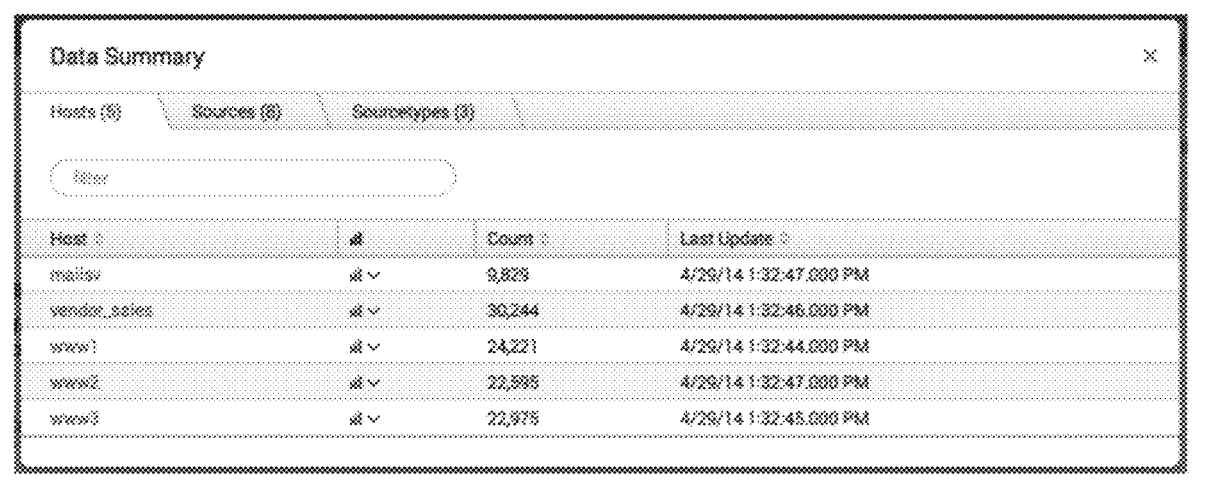

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

Performing Searches Based on Qualitative Search Terms

Figure 7A:
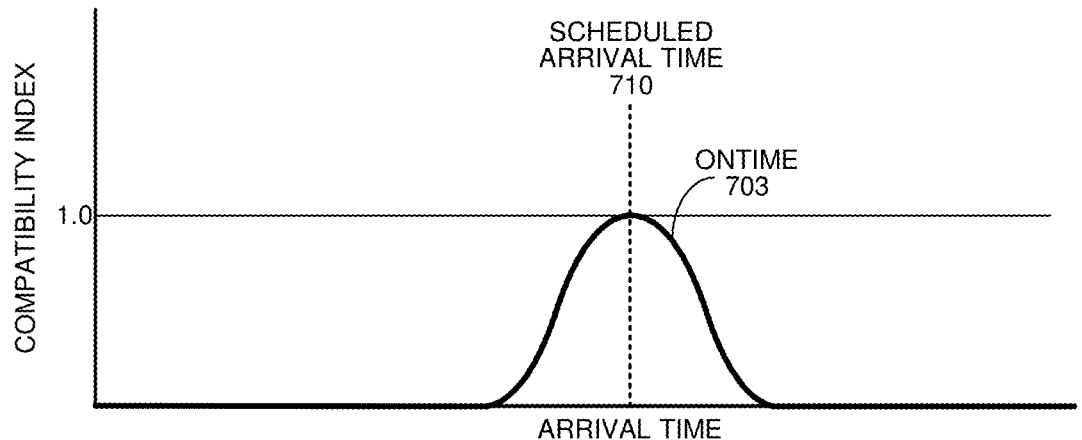
FIG. 7A illustrates an exemplary concept-mapping in accordance with the disclosed embodiments.

A major challenge in processing a query containing a qualitative search term is to translate the qualitative search term into a mathematical representation that can be applied to numerical values in a data set. This can be accomplished by using a concept-mapping function as is illustrated in FIG. 7A. This concept-mapping function represents the concept "ontime" by associating specific arrival times (indicated on the x axis) with compatibility index values between 0 and 1 (indicated on the y axis). As illustrated in FIG. 7A, when an arrival time varies from a scheduled arrival time 710, the corresponding compatibility index decreases from a maximum value of 1 toward a value of zero. This concept-mapping function approximates the way a user thinks about the concept "ontime," because the closer the arrival time is to the scheduled arrival time 710, the more likely a user will be to consider the arrival time to be "ontime." For example, a user is very likely to consider an arrival time within one minute of a scheduled arrival to be "ontime," whereas the user is considerably less likely to consider an arrival time 15 minutes past the scheduled arrival time to be ontime. Note that the shapes of concept-mapping functions can vary among different users and different contexts as is discussed in further detail below.

Figure 7B:
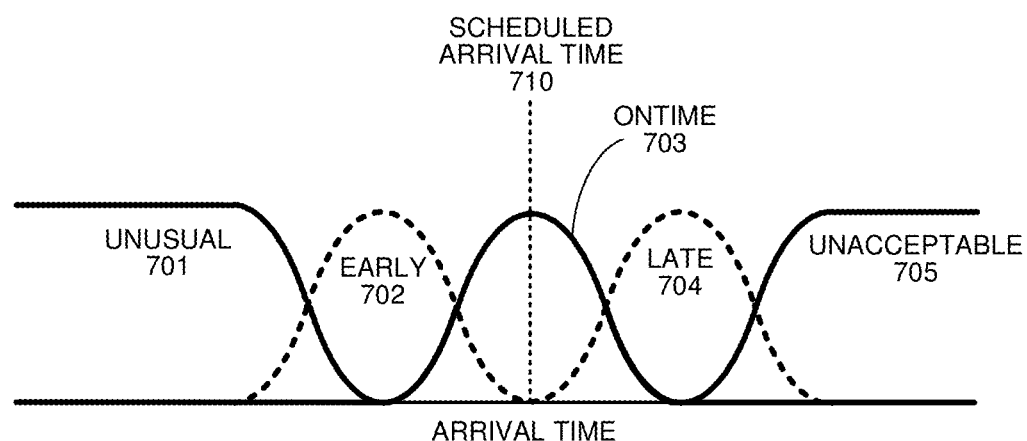
FIG. 7B illustrates a set of context-mappings that comprise a context in accordance with the disclosed embodiments.

The disclosed embodiments combine a set of related concepts that apply to an attribute into an entity referred to as a "context" as is illustrated in FIG. 7B. The context illustrated in FIG. 7B includes five overlapping context-mappings related to the attribute "arrival time." These concept-mappings represent the concepts "unusual," "early," "ontime," "late," and "unacceptable." More specifically, from left to right, the first solid line segment 701, which drops from 1 to 0, represents the concept "unusual." The next overlapping dashed line segment 702, which rises from 0 to 1 and then falls to 0, represents the concept "early." The next overlapping solid line segment 703, which rises from 0 to 1 and then falls back to 0, represents the concept "ontime." The next, overlapping dashed line segment 704, which rises from 0 to 1 and then back falls to 0, represents the concept "late." Finally, the last overlapping solid line segment 705, which rises from 0 to 1, represents the concept "unacceptable."

Note that adjoining concept-mapping functions within a context can overlap because a user is likely to consider values between adjoining concepts to be related to both concepts. For example, a user may consider an arrival time of nine minutes past a scheduled arrival time to be both somewhat ontime and somewhat late. In some embodiments, the sum of the compatibility indices at each point in these overlapping regions equals 1.

Figure 7C:
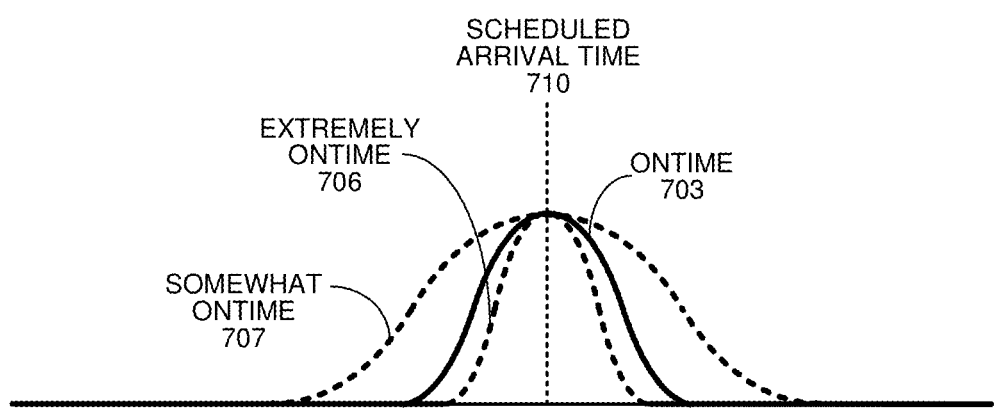
FIG. 7C illustrates how hedges can be applied to a concept-mapping in accordance with the disclosed embodiments.

The above-described technique can be modified by applying linguistic hedges to a concept-mapping function as is illustrated in FIG. 7C. In this example, applying the linguistic hedge "extremely" to the qualitative search term "ontime" causes the distribution of the resulting concept-mapping to be sharpened to produce the function represented by the dashed line 706, in which only arrival times that are very close to the scheduled arrival time 710 have a compatibility index close to 1. In contrast, applying the linguistic hedge "somewhat" to the qualitative search term "ontime" causes the distribution of the resulting concept-mapping to be more disbursed to produce the function represented by the dashed line 707, in which arrival times that are farther from the scheduled arrival time 710 can have a compatibility index close to 1. In general, hedges can be associated with any possible linguistic modifier for a qualitative search term. For, example hedges can include terms such as "very," "extremely," "somewhat," "not," "close to," "above," "below," and "quite." Moreover, multiple hedges can be applied to a single search term. For example, the string of hedges "extremely close to below" can be applied to the qualitative search term "ontime." Note that the possible types of hedges are, in theory, unlimited. This can be achieved by using "synonyms", which map words to hedges. For example, a query can say "darn high," where "darn" is a synonym for "very".

These concept-mappings and associated hedges are related to "fuzzy logic," which was developed to model cognitive systems. (See Cox, E. D., "Solving Problems with Fuzzy Logic," AI Expert, January 1992, Pages 40-45.) Although fuzzy logic has been discussed extensively in the academic literature, because of challenges relating to computational requirements, development of query languages, and management of contextual information, it has so far not been effectively applied in practical query-processing systems that operate on large data sets.

Figure 8:
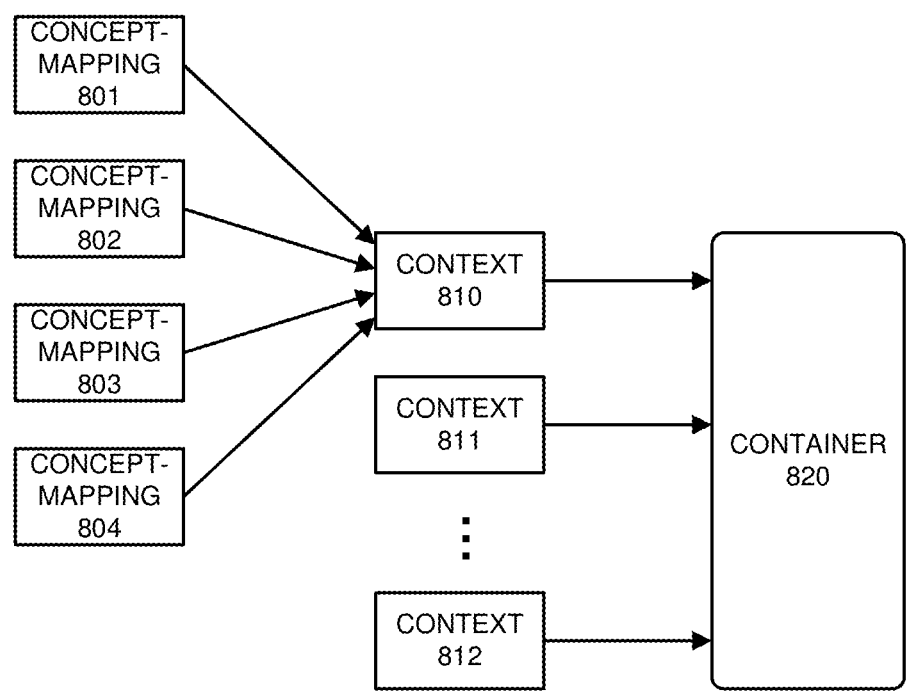
FIG. 8 illustrates various concepts, and contexts and an associated container in accordance with the disclosed embodiments.

The disclosed embodiments address these challenges by representing concept-mappings and associated contexts using a number of data structures that are illustrated in FIG. 8. As illustrated in FIG. 8, each concept-mapping is represented as a data structure, such as concept-mappings 801-804. Moreover, one or more related context-mappings can be incorporated into each context. For example, concept-mappings 801-804 are incorporated into context 810. Also, a set of related contexts can be stored in the same container. For example, related contexts 810-812 are stored in container 820.

Each of concept-mappings 801-804 illustrated in FIG. 8 can be represented using a data structure that specifies attributes of the concept-mapping, including: (1) the name of the associated qualitative search term (e.g., "late"), (2) an identifier for the attribute that the qualitative search term applies to (e.g., arrival time), and (3) a representation of the concept-mapping function. In some embodiments, the concept-mapping function is represented using an array of x and y coordinates that describes the shape of the concept-mapping function. For example, the concept-mapping function for the qualitative search term "ontime" illustrated in FIG. 7A can be represented using 256 equally spaced points along the x axis, wherein each point has a corresponding y value on the curve 703, which represents the concept "ontime." These (x,y) coordinate pairs can be stored in an array containing 256 entries for coordinate pairs. Each (x,y) coordinate pair in this array associates an attribute value x with a corresponding compatibility index y. Representing a concept-mapping function in this way enables the system to rapidly look up a compatibility index for a given attribute value.

Instead of using an array, the concept-mapping function can alternatively be represented using a mathematical function that maps attribute values to corresponding compatibility indices. However, a functional representation of this type can require more mathematical operations to be performed at search time as compared with a simple array lookup. However, an array of data values is likely to occupy considerably more space than a representation of a function.

The disclosed embodiments can also create a one-concept context for a scalar value that appears in a query. For example if the scalar value 65 appears in a query, a context can be created with a single concept-mapping function that has non-zero compatibility indices over the range 65±2.5%. This facilitates using a scalar value in combination with other qualitative search terms that are applied to other attribute values in the same query. Note that the +/−2.5% range is a default range, but is also configurable.

A number of related concept-mapping data structures can be combined into data structures referred to as a "context," wherein the context can specify: (1) a context name, (2) a class identifier, (3) the type of context, (4) the names of the concept-mappings contained in the context, (4) the shapes of concept-mapping functions in the context, and (6) other instructions that specify how to generate the context. More specifically, the context name (e.g., "arrival time") identifies the specific context. The class identifier specifies a class of events to which the context applies (e.g., gender=female). Recall that this class information is specified in one or more fields in each event record. The type of context (e.g., "domain" or "average centered" or "median centered") specifies how the bounds of the context are determined, as is discussed in more detail below. The names of the concepts (e.g., "early," "ontime," and "late") identify the context-mappings contained in the context. The shapes of the concept-mapping functions (e.g., "linear," "trapezoidal," "triangular") can be defined by a domain expert; alternatively, default shapes may be used. Finally, the other instructions can specify a search that is used to obtain a set of events that are used to generate the context.

Finally, a collection of related contexts can be incorporated into a container 820, which comprises a file that contains a collection of contexts that can possibly be related (but are not necessarily related). For example, a container can contain user-specific contexts associated with a specific user, or organization-specific contexts associated with a specific organization. This allows the system to maintain customized sets of the contexts for different users or organizations. Also, the name of a specific container can be indicated in a query, which enables the query to use a customized set of contexts for qualitative search terms.

In some cases, a container can include different class-specific contexts for a given attribute. For example, an exemplary container can include class-specific contexts for the attribute "height," including a context for "male height," which is specific to the class gender=male; a context for "female height," which is specific to the class gender=female; and a default context for "height," which is not gender-specific. This enables a query to be applied using gender-specific contexts based on a gender indicated in a corresponding gender field in each event. In another example, a container can include class-specific contexts for different types of operating systems for computers, including contexts for "operating system=Windows," "operating system=Linux," "operating system=OS X" and a default context. This enables a query to be applied using operating-system-specific contexts based on an operating system indicated in a corresponding operating-system field in each event.

Context Variations

In describing the ways in which a context can constructed, one can distinguish between a necessary process and an example of a possible technique. There are three areas of technique that can be alluded to but not made a specific case of necessity: (1) the ways in which the underlying qualitative semantics (fuzzy sets) are generated, (2) the shape of the fuzzy set (e.g., concept-mapping function), and (3) the order of the fuzzy sets.

We first describe the ways in which fuzzy sets can be created. When we create an adaptive context, the number, shapes, and order of the underlying qualitative semantics (fuzzy sets) are determined by some function (or set of functions) that characterizes the data. These functions can be or can be derived from analytical, probabilistic, evolutionary, or subjective processes (or any other process that, in the future might be generated by some other machine intelligence). Analytical means that the function is an algorithm, a heuristic, or a blending of the two. Probabilistic means that the characteristic is derived from the probabilities (and cumulative probability distribution functions, perhaps) associated with, as an example, incoming sets of events (such as Bayes Theorem or Markov Models). Evolutionary means that that the characteristic is derived from an exploration of how a collected set of parameters can be simultaneously evaluated to fund the best (optimal or near optimal) set of characteristics (in this case we use evolutionary strategies such as genetic algorithms, Monte Carol simulation, and so forth). Subjective means that the analyst simply picks defining characteristic properties that he/she/it feels is a good approximation of the data (the "it" hear means that the subject matter expert (analyst) might also be an intelligent or non-intelligent machine system, such as co-operating cellular automata networks). Any of these approaches might also take into account the time varying or data dimensional periodicity of the data.

Just to give a brief example, techniques can be based on any statistical or mathematical property (or set of properties), not necessarily limited to the average or even the mode. As just a few quick examples, when we say "average" we mean the entire computational class of averages: arithmetic, weighted, geometric, and so forth. But an underlying collection of qualitative semantics can be generated in many ways from any functional, algorithmic, or heuristic methodology. In a multi-modal distribution, as an example, each mode, perhaps weighted by its normalized, relative frequency to all the other modes, represents an anchor fuzzy set. The other fuzzy sets (semantics) are then generated (perhaps to the left and right) from theses anchor sets, hence creating a set of semantics representing the "centers of data intensity" in the context. But the parameters that characterize the data (and from which the context is generated) can be drawn from any set of statistical properties as well as deterministic as well as stochastic processes. As an example we might pick a random number drawn from the descriptive properties of the data, or we might use a Monte Carlo or genetic algorithm to explore the best possible partitioning of the data. In fact, in keeping with an information theory approach to handling entropy, we might inject a context with some kind of random background noise (uniform, Gaussian, etc) and then construct semantics on top of this noise layer.

We next describe the shapes. Cognitive based qualitative semantics are, in most cases, naturally defined by bell-shapes and sigmoid (S) shapes. These bell-shaped fuzzy sets are not necessarily derived from the statistical properties of the data. But the shape of a fuzzy set can be arbitrary (defined by a set of points, as an example) as well as a trapezoid, a triangular, a singleton, and so forth. Fuzzy sets of many different shapes can also be generated from a scalar or a set of scalars. Fuzzy sets are not always symmetrical. They can have irregular shapes (like a skew and kurtosis in a bell curve or a difference in angle of the sides in trapezoids, and so forth).

We finally describe the order. The order of a fuzzy set is determined by the nature of the values on the domain and the membership axes. Currently we are using first-order fuzzy sets—the values on each axis are ordinary numbers. In a second order fuzzy set, the values of each axis is a fuzzy set. This creates a fuzzy set whose membership function is a band of different "densities." Second order fuzzy sets will be very important in cognitive models. There are higher order fuzzy sets and we reserve them as part of the patent.

There are also other factors that are used to characterize a collection of qualitative semantics in a context: the amount of overlap between neighboring fuzzy sets, the alpha cut for determining the strength of the fuzzy set, the method of decomposition and aggregation in determining the compatibility index, and so forth.

Commands to Facilitate Conceptual Searches

The above-described event-based query-processing system can be augmented to facilitate searches based on qualitative search criteria by incorporating a number of additional commands into the search language (e.g., SPL). For example, FIG. 9A illustrates a number of conceptual-search commands that can be incorporated into the search language in accordance with the disclosed embodiments. The most fundamental conceptual-search command is the "xswhere" command that operates like a normal "where" command in SPL, except that it facilitates looking for events based on one or more qualitative search terms.

A number of these conceptual-search commands can be used to perform operations on individual concepts or contexts, including data-driven commands to clone, create, delete or display concepts and contexts. There also exists an "xsCreateUDContext" command to facilitate creating a user-defined context. The command "xsGetWhereCa" computes one or more compatibility indices for an event and then forwards the computed compatibility indices along with the event to facilitate downstream processing of the event. The conceptual-search commands also include commands to list concepts and contexts as well as the command "xsListUOM," which lists units of measure (e.g., "centimeters" or "kilograms") for specific attributes associated with contexts. There also exist commands to merge, rename and update contexts.

The "xsDiscoverTrend" command facilitates discovering trends in specific attribute values associated with contexts. It operates by running a regression over attribute values in the events to determine a function that represents the attribute values. The "xsDisplayWhere" command displays the resulting concept-mapping function for an "xsWhere" query, possibly including hedges. The "xsFindBestConcept" command returns a concept from a context that best matches a specific attribute value. The "xsFindMembership" command computes a compatibility index for each concept-mapping in a context, and then adds a field for each of the computed indices to the event and forwards the computed compatibility indices along with the event to facilitate downstream processing. The command "xsUpdateUDContext" updates a user-defined context. (Note that associating zero events with a context prevents the system from updating the context.) There also exist macros, which are not preceded by the prefix "xs," comprising sequences of commands that perform operations including: finding the best concept, creating a context and discovering a trend.

There also exist statistical-reasoning commands that are illustrated in FIG. 9B. These statistical-reasoning commands perform standard correlations and regressions. Statistical-reasoning commands that are prefixed with "xsPerform" generate an algorithm given a set of events. Statistical-reasoning commands that are prefixed with "xsApply" apply the algorithm to future events. Statistical-reasoning commands that are prefixed with "xsAggregate" can be used to combine results from the "xsPerform" commands in a weighted fashion if the underlying functions are additive. For example, the system can perform a linear regression every hour, and these hourly linear regressions can be aggregated over an entire day to produce a linear regression for the day. The "xsPredict" command facilitates predicting future attribute values. Finally, the "xsGetDistance" command implements the Haversine distance-computation technique to facilitate processing queries that involve distances.

Query Processing Operations

Figure 10:
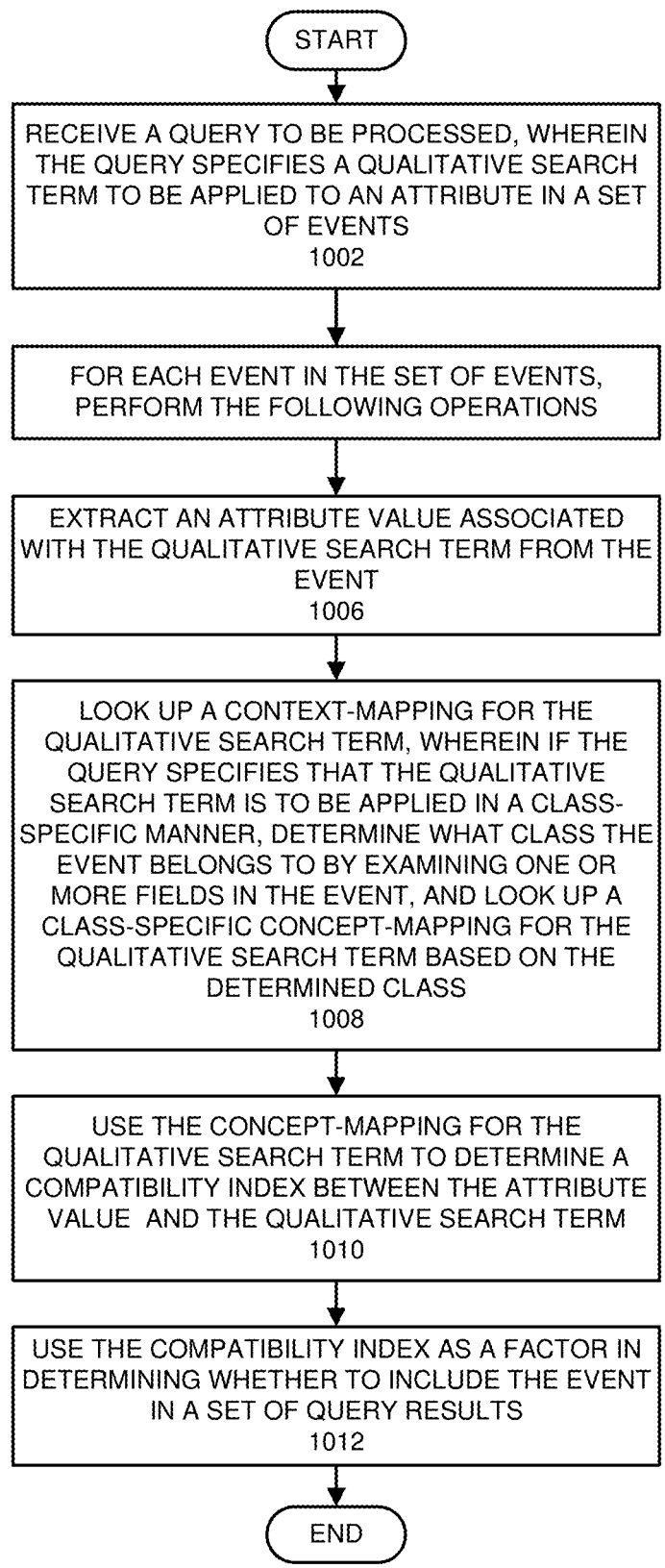
FIG. 10 presents a flow chart illustrating how a query containing a qualitative search term can be processed in accordance with the disclosed embodiments.

FIG. 10 presents a flow chart illustrating how a query containing a qualitative search term can be processed in accordance with the disclosed embodiments. First, the system receives a query to be processed, wherein the query specifies a qualitative search term to be applied to an attribute (step 1002). Note that commands associated with qualitative search terms can be chained together in SPL by using pipe symbols "|".

Then, for each event in the set of events, the system performs the following operations. First, the system extracts an attribute value associated with the qualitative search term from the event (step 1006). Next, the system looks up a context-mapping for the qualitative search term. If the query specifies that the qualitative search term is to be applied in a class-specific manner, the system determines what class the event belongs to by examining one or more fields in the event, and then looks up a class-specific concept-mapping for the qualitative search term based on the determined class (step 1008). In this way a single query can apply different class-specific contexts to each event depending upon which class is specified by fields in the event.

Next, the system uses the concept-mapping for the qualitative search term to determine a compatibility index between the attribute value and the qualitative search term (step 1010). Finally, the system uses the determined compatibility index as a factor in determining whether to include the event in a set of query results (step 1012).

Figure 11:
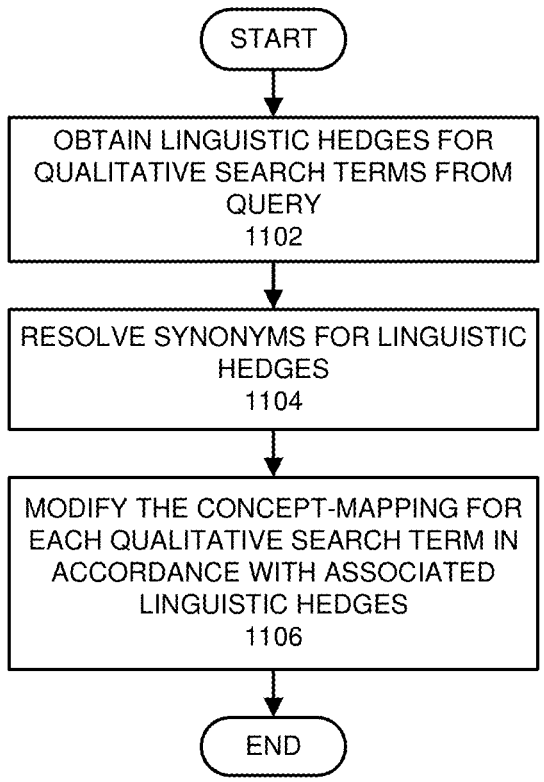
FIG. 11 presents a flow chart illustrating how linguistic hedges can be processed in accordance with the disclosed embodiments.

FIG. 11 presents a flow chart illustrating how linguistic hedges can be processed in accordance with the disclosed embodiments. First, the system obtains linguistic hedges for qualitative search terms from a query (step 1102). This can take place when the system is parsing the query. Next, the system resolves synonyms for linguistic hedges (step 1104). This can involve performing a lookup in a table containing synonyms and associated hedges. Finally, the system modifies the concept-mapping for each qualitative search term in accordance with the associated linguistic hedges (step 1106). Techniques for mathematically modifying such concept-mappings based on linguistic hedges are well known in the art. For example, see De Cock, M. and Kerre, E. E., "A Context-Based Approach to Linguistic Hedges," Int. J. Appl. Math. Comp. Sci., 2002, Vol. 12, No. 3, 371-382.

Figure 12:
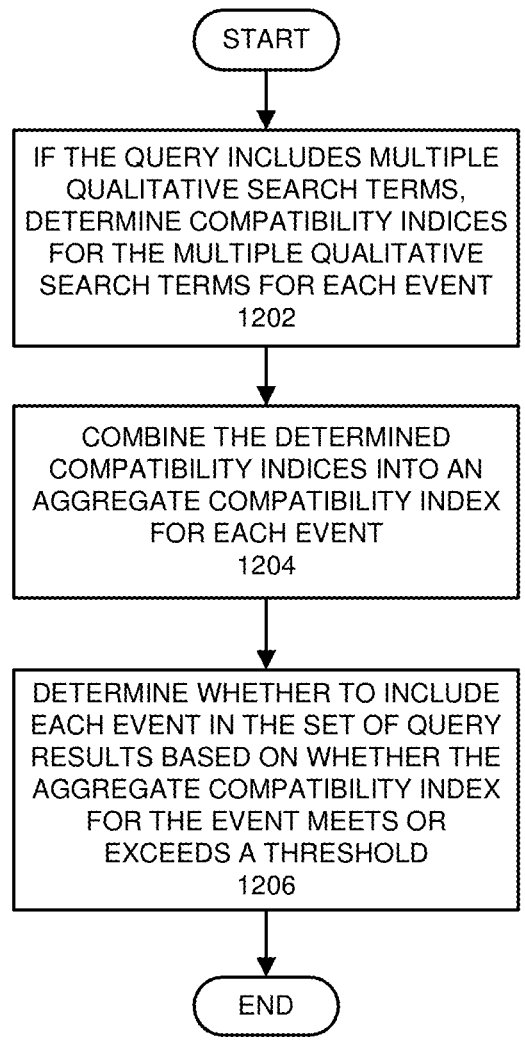
FIG. 12 presents a flow chart illustrating how compatibility indices for different qualitative search terms can be combined during query processing in accordance with the disclosed embodiments.

FIG. 12 presents a flow chart illustrating how compatibility indices associated with different qualitative search terms can be combined with each other during query processing in accordance with the disclosed embodiments. If the query includes multiple qualitative search terms, the system first determines compatibility indices for the multiple qualitative search terms for each event (step 1202). Next, the system combines the determined compatibility indices into an aggregate compatibility index for each event (step 1204). For example, the compatibility indices can be combined by computing an average of the compatibility indices, or alternatively by computing a weighted average of the compatibility indices based on an ordering of associated qualitative search terms in the query. Note that qualitative search terms that appear earlier in the query are likely to be more important than qualitative search terms that appear later in the query. Hence, the system can weight the earlier qualitative search terms more highly than the later qualitative search terms while computing the average. Finally, the system determines whether to include each event in the set of query results based on whether the aggregate compatibility index for the event meets or exceeds a threshold (step 1206). For example, this threshold can be the 0.2 value, which is associated with an "alpha cut."

Context-Updating Operations

Figure 13:
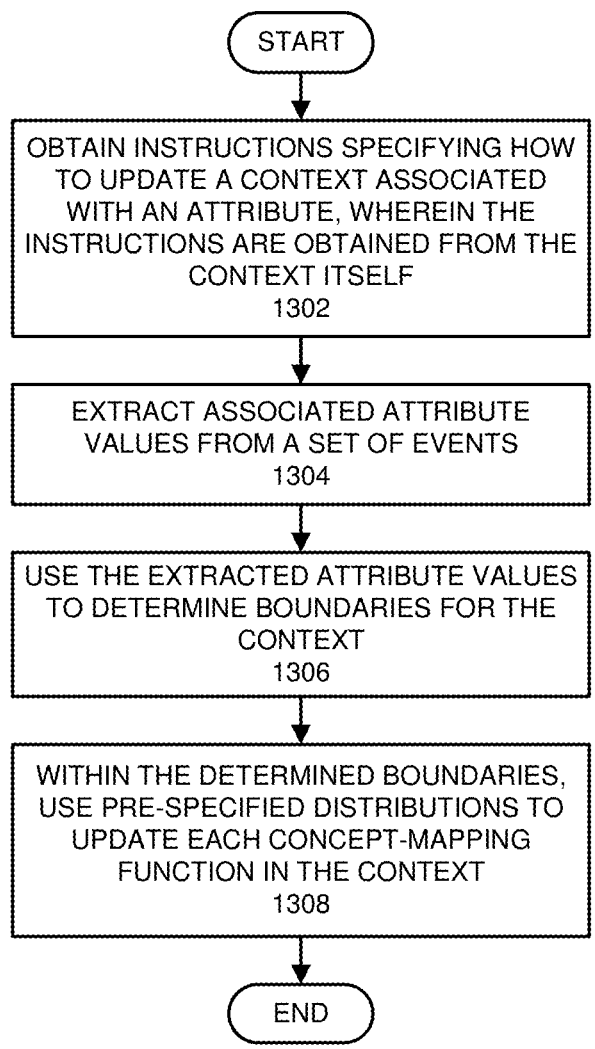
FIG. 13 presents a flow chart illustrating how a context can be updated in accordance with the disclosed embodiments.

FIG. 13 presents a flow chart illustrating how a context can be updated in accordance with the disclosed embodiments. First, the system obtains instructions specifying how to update a context associated with an attribute (step 1302). In some cases, these instructions can be obtained from the context itself, which makes the context "self aware," meaning that the context is aware of how it was created. Next, the system extracts associated attribute values from a set of events (step 1304).

The system then uses the extracted attribute values to determine boundaries for the context (step 1306). Note that each concept-mapping within a context has the same boundaries (start point and end point). The boundaries for a "domain context" can be determined by looking at the range of attribute values contained in the set of events, wherein the minimum attribute value and the maximum attribute value in the range can be used to define the boundaries of the domain. The boundaries for an "average-centered context" can be determined by computing an average attribute value and a standard deviation based on the extracted attribute values, and then radiating outward from the average value based on the standard deviations to determine boundaries for the domain. The boundaries for a "mean-centered context" can be determined similarly, except that the mean value is used in place of the average value. The system can also employ a user-specified center value to determine the boundaries of a context.

The width of the context can be computed in a manner that takes into account the number of overlapping contexts contained in the event. For example, if the context (e.g., arrival time) includes five overlapping concepts (e.g., unusual, early, ontime, late, unacceptable), wherein each concept-mapping function is two standard deviations wide, and adjacent context-mapping functions overlap by one standard deviation, then the entire context will be six standard deviations wide. Hence, the boundaries of a corresponding average-centered context can be computed using the following equations:

$$\max = \text{avg}(x) + \text{sdev}(x) * \text{numConcepts; and}$$

$$\min = \text{avg}(x) - \text{sdev}(x) * \text{numConcepts.}$$

Note that the system also supports median-centered contexts, wherein a median-centered context uses median(x) instead of avg(x) as its center.

In some embodiments, the width of a context is determined by computing a weighted average of the width of the previous context and a width computed based on the extracted attribute values.

Finally, within the determined boundaries, the system can use pre-specified distributions to update each concept-mapping function in the context (step 1308). Note that the shapes of these pre-specified distributions for the concept-mapping functions can be defined by a domain expert. Also, note that a context can be updated manually or through a periodically scheduled update.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. A method for executing a query, comprising:
receiving the query at a computer system, wherein the query comprises a plurality of qualitative search terms, and wherein the query applies a qualitative search term to an attribute of data items in a set of data items;
processing, in response to the query, at least one data item in the set of data items by:
extracting an attribute value from the data item associated with the qualitative search term,
selecting, from a plurality of class-specific concept-mapping functions and a default concept-mapping function, a class-specific concept-mapping function for the attribute, wherein the class-specific concept-mapping function matches a class associated with the data item, wherein the default concept-mapping function is not specific to the class, and
using the class-specific concept-mapping function to determine a compatibility index for the attribute value, wherein the class-specific concept-mapping function relates each attribute value of a plurality of attribute values with a numerical compatibility index, the numerical compatibility index identifies a compatibility between the attribute value and the qualitative search term;
determining compatibility indices for the plurality of qualitative search terms for each data item in the set of data items;
combining the determined compatibility indices into an aggregate compatibility index for each data item,
wherein combining the determined compatibility indices involves one of computing an average for the plurality of compatibility indices, and computing a weighted average for the plurality of compatibility indices based on an ordering of associated qualitative search terms in the query; and
determining whether to include each data item in a set of query results based on whether the aggregate compatibility index for the data item meets or exceeds a threshold.

2. The method of claim 1,
wherein the class-specific concept-mapping function is part of a context comprising a set of concept-mapping functions associated with a set of qualitative search terms for the attribute.

3. The method of claim 1,
wherein when the attribute is "height" and the qualitative search term is "tall," the class-specific concept-mapping function produces a compatibility index between 0 and 1.0 that associates a specific height with the term "tall", and
wherein the context can include concept-mapping functions for a set of qualitative search terms including "short," "medium" and "tall".

4. The method of claim 1, wherein the class-specific concept-mapping function is stored in a container file that contains a related set of concept-mapping functions.

5. The method of claim 1, wherein the class-specific concept-mapping function is stored as an array of data values representing a function that maps attribute values to corresponding compatibility indices.

6. The method of claim 1,
wherein the class-specific concept-mapping function is part of a context comprising a set of concept-mapping functions associated with a set of qualitative search terms for the attribute; and wherein the method further comprises updating the context at periodic or aperiodic intervals based on instructions contained in the context.

7. The method of claim 1, wherein when the query includes a linguistic hedge that modifies the qualitative search term, the method further comprises modifying the class-specific concept-mapping function in accordance with the linguistic hedge prior to using the class-specific concept-mapping function.

8. The method of claim 1,
wherein when the query includes a linguistic hedge that modifies the qualitative search term, the method further comprises modifying the class-specific concept-mapping function in accordance with the linguistic hedge; and
wherein the processing of the query includes resolving synonyms for the linguistic hedge prior to using the linguistic hedge to modify the class-specific concept-mapping function.

9. The method of claim 1, wherein when the query includes a scalar value, the method further comprises creating a concept-mapping function for the scalar value that associates non-zero compatibility indices with attribute values that fall within a specified range of the scalar value.

10. A non-transitory computer-readable storage medium storing instructions that when executed by a computer cause the computer to perform a method for executing a query, the method comprising:
receiving the query, wherein the query comprises a plurality of qualitative search terms, and wherein the query applies a qualitative search term to an attribute of data items in a set of data items;
processing, in response to the query, at least one data item in the set of data items by,
extracting an attribute value from the data item associated with the qualitative search term,
selecting, from a plurality of class-specific concept-mapping functions and a default concept-mapping function, a class-specific concept-mapping function for the attribute, wherein the class-specific concept-mapping function matches a class associated with the data item, wherein the default concept-mapping function is not specific to the class, and
using the class-specific concept-mapping function to determine a compatibility index for the attribute value, wherein the class-specific concept-mapping function relates each attribute value of a plurality of attribute values with a numerical compatibility index, the numerical compatibility index identifies a compatibility between the attribute value and the qualitative search term;
determining compatibility indices for the plurality of qualitative search terms for each data item in the set of data items;
combining the determined compatibility indices into an aggregate compatibility index for each data item, wherein combining the determined compatibility indices involves one of computing an average for the plurality of compatibility indices, and computing a weighted average for the plurality of compatibility indices based on an ordering of associated qualitative search terms in the query; and
determining whether to include each data item in a set of query results based on whether the aggregate compatibility index for the data item meets or exceeds a threshold.

11. The non-transitory computer-readable storage medium of claim 10,
wherein the class-specific concept-mapping function is part of a context comprising a set of concept-mapping functions associated with a set of qualitative search terms for the attribute.

12. The non-transitory computer-readable storage medium of claim 10, wherein the class-specific concept-mapping function is stored in a container file that contains a related set of concept-mapping functions.

13. The non-transitory computer-readable storage medium of claim 10, wherein the class-specific concept-mapping function is stored as an array of data values representing a function that maps attribute values to corresponding compatibility indices.

14. The non-transitory computer-readable storage medium of claim 10,
wherein the class-specific concept-mapping function is part of a context comprising a set of concept-mapping functions associated with a set of qualitative search terms for the attribute; and
wherein the method further comprises updating the context at periodic or aperiodic intervals based on instructions contained in the context.

15. The non-transitory computer-readable storage medium of claim 10, wherein when the query includes a linguistic hedge that modifies the qualitative search term, the method further comprises modifying the class-specific concept-mapping function in accordance with the linguistic hedge prior to using the class-specific concept-mapping function.

16. The non-transitory computer-readable storage medium of claim 10,
wherein when the query includes a linguistic hedge that modifies the qualitative search term, the method further comprises modifying the class-specific concept-mapping function in accordance with the linguistic hedge; and
wherein the processing of the query includes resolving synonyms for the linguistic hedge prior to using the linguistic hedge to modify the class-specific concept-mapping function.

17. The non-transitory computer-readable storage medium of claim 10, wherein when the query includes a scalar value, the method further comprises creating a concept-mapping function for the scalar value that associates non-zero compatibility indices with attribute values that fall within a specified range of the scalar value.

18. A system, comprising:
at least one processor and at least one associated memory; and
a query processor that executes on the at least one processor and performs the following operations:
receives the query, wherein the query comprises a plurality of qualitative search terms, and wherein the query applies a qualitative search term to an attribute of data items in a set of data items,
processes, in response to the query, at least one data item in the set of data items by,
extracting an attribute value from the data item associated with the qualitative search term,
selecting, from a plurality of class-specific concept-mapping functions and a default concept-mapping function, a class-specific concept-mapping function for the attribute, wherein the class-specific concept-mapping function matches a class associated with the data item, wherein the default concept-mapping function is not specific to the class, and using the class-specific concept-mapping function to determine a compatibility index for the attribute value, wherein the class-specific concept-mapping function relates each attribute value of a plurality of attribute values with a numerical compatibility index, the numerical compatibility index identifies a compatibility between the attribute value and the qualitative search term, determines compatibility indices for the plurality of qualitative search terms for each data item in the set of data items, combines the determined compatibility indices into an aggregate compatibility index for each data item, wherein combining the determined compatibility indices involves one of computing an average for the plurality of compatibility indices, and computing a weighted average for the multiple compatibility indices based on an ordering of associated qualitative search terms in the query, and determines whether to include each data item in a set of query results based on whether the aggregate compatibility index for the data item meets or exceeds a threshold.

19. The system of claim 18,
wherein the class-specific concept-mapping function is part of a context comprising a set of concept-mapping functions associated with a set of qualitative search terms for the attribute.

20. The system of claim 18, wherein the class-specific concept-mapping function is stored in a container file that contains a related set of concept-mapping functions.

21. The system of claim 18, wherein the class-specific concept-mapping function is stored as an array of data values representing a function that maps attribute values to corresponding compatibility indices.

22. The system of claim 18,
wherein the class-specific concept-mapping function is part of a context comprising a set of concept-mapping functions associated with a set of qualitative search terms for the attribute; and
wherein the query processor updates the context at periodic or aperiodic intervals based on instructions contained in the context.

23. The system of claim 18, wherein when the query includes a linguistic hedge that modifies the qualitative search term, the query processor modifies the class-specific concept-mapping function in accordance with the linguistic hedge prior to using the class-specific concept-mapping function.

24. The system of claim 18,
wherein when the query includes a linguistic hedge that modifies the qualitative search term, the query processor modifies the class-specific concept-mapping function in accordance with the linguistic hedge; and
wherein the processing of the query includes resolving synonyms for the linguistic hedge prior to using the linguistic hedge to modify the class-specific concept-mapping function.

25. The system of claim 18, wherein when the query includes a scalar value, the query processor creates a concept-mapping function for the scalar value that associates non-zero compatibility indices with attribute values that fall within a specified range of the scalar value.

* * * * *